Sept. 11, 1934. B. E. CLARKSON 1,973,681
INDUSTRIAL TRUCK
Filed May 5, 1930 2 Sheets-Sheet 1
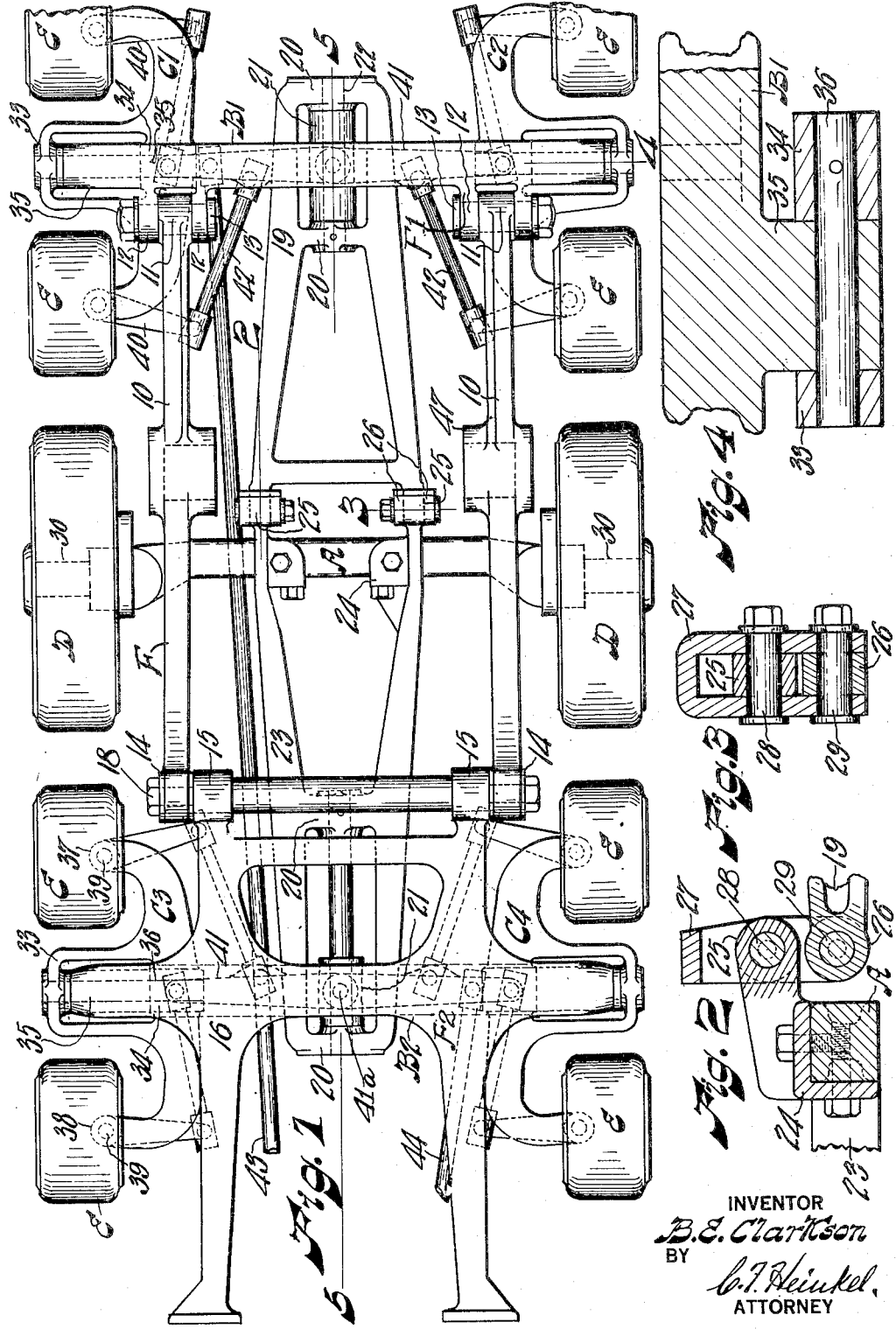
INVENTOR
B.E. Clarkson
BY
C.T. Heinkel
ATTORNEY

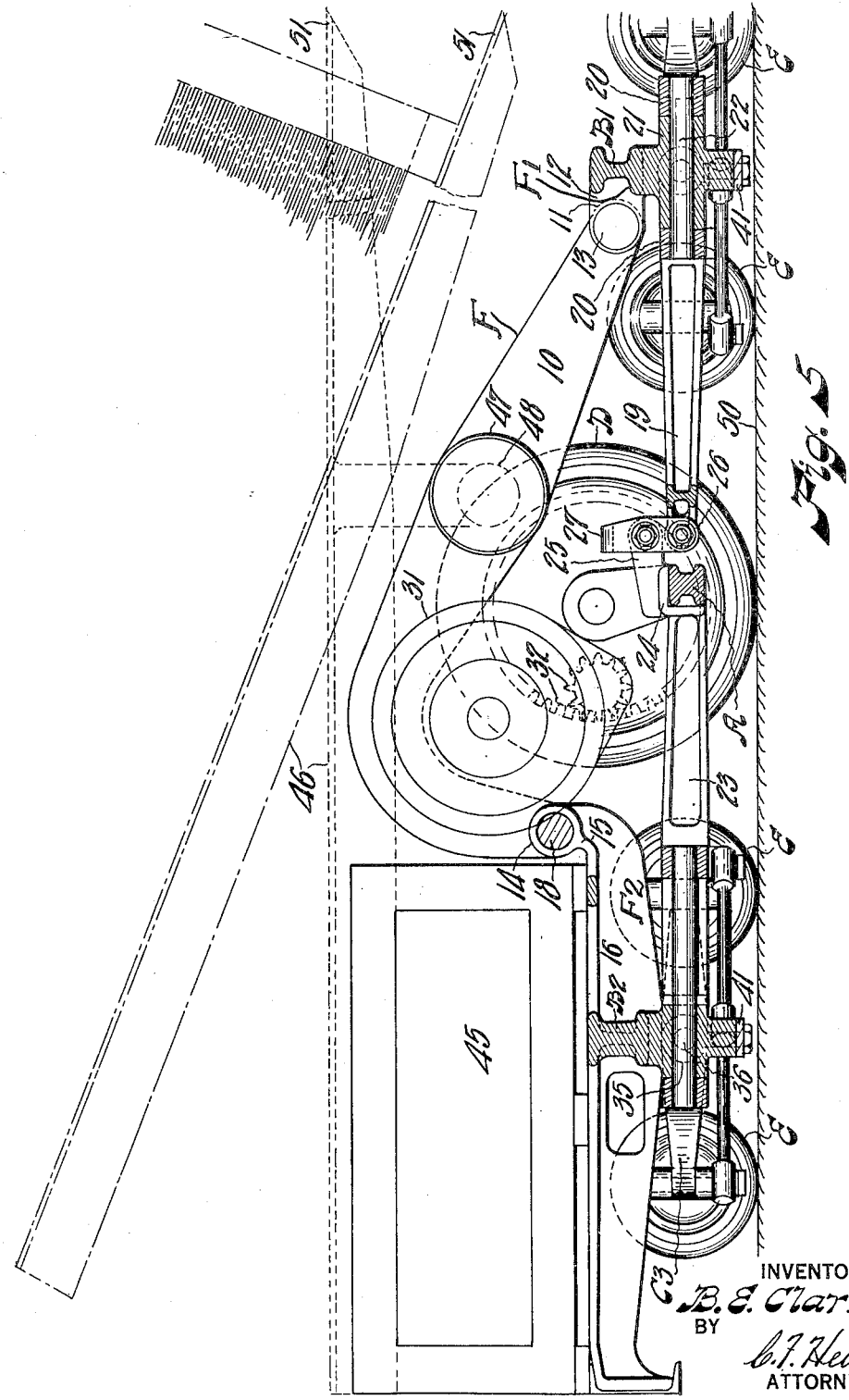

Patented Sept. 11, 1934

1,973,681

UNITED STATES PATENT OFFICE 1,973,681

INDUSTRIAL TRUCK

Bradley E. Clarkson, Cleveland, Ohio, assignor to The Atlas Bolt and Screw Company, Cleveland, Ohio Application May 5, 1930, Serial No. 449,887

14 Claims. (Cl. 180—22)

My invention relates to industrial trucks generally and more specifically to framing and steering mechanisms therefor.

An object of my invention is a simple and efficient industrial truck.

Another object of my invention is an industrial truck which does not capsize when turning corners or is run on uneven ground or floor or when a load thereon shifts to one side.

Another object of my invention is an efficient means for proportionate distribution of the weight of the truck and of a load thereon onto all of the wheels on the truck.

Another object of my invention is an industrial truck having a large load carrying area.

Another object of my invention is an industrial truck adapted to be steered to travel on a short radius path.

Other objects will appear in this specification or will become obvious or apparent or will suggest themselves upon an inspection of the accompanying drawings and of this specification.

For purposes of illustration but not of limitation, I have shown in the accompanying drawings one type of industrial truck having my invention embodied therein in one form and describe the same specifically in this specification although I am aware that my invention can be applied to different kinds or types of industrial trucks.

In the accompanying drawings mentioned above:

Fig. 1 is a plan view of an industrial truck embodying my invention.

Fig. 2 is a fragmental sectional view, on a larger scale, taken in a vertical plane longitudinally of the truck indicated by the line 2 in Fig. 1.

Fig. 3 is a fragmental sectional view, on a larger scale, taken in a vertical plane transversely of the truck indicated by the line 3 in Fig. 1.

Fig. 4 is a fragmental sectional view, on a larger scale, taken in a vertical plane transversely of the truck indicated by the line 4 in Fig. 1.

Fig. 5 is a section taken in a vertical plane longitudinally of the truck indicated by the line 5—5 in Fig. 1.

Similar reference characters refer to similar parts throughout the views.

The specific structure shown in the accompanying drawings comprises, principally, a framing composed of a mid section F, an end section F1 forwardly of the mid section, an end section F2 rearwardly of the mid section, a main axle A below the mid section, a sub-axle B1 on the end section F1, a sub-axle B2 on the end section F2, a sub-framing or connector means between the end sections and the main axle, a bracket on each end of each of the sub-axles, driving wheels on the main axle, two steering wheels on each of the brackets, and a steering mechanism.

The mid section F comprises the two substantially horizontal and parallelly spaced parts 10 each having the bosses 11 on one end thereof for vertically pivotal connection to the end section F1 and the sub-axle B1 through the bosses 12 thereon and the pivot pins 13 extending through the respective bosses 11 and 12 transversely of the truck as illustratively seen in Fig. 4. The mid section F also has the bosses 14 on the other end thereof for vertically pivotal connection to the bosses 15 on the end section F2 and the pivot pin 18 extending through all of the bosses 14 and 15 transversely of the truck.

The parts 10 are arched upwardly in this instance to clear structure below the same for compactness of the truck and this arching is further taken advantage of to support a platform, particularly a tilting platform as will be explained below.

The sub-framing or connecting means comprises the spider like part 19 having the bosses 20 on the outer end thereof for transversely pivotal connection to the boss 21 extending downwardly from the sub-axle B1 through the pivot pin 22, the axis of which is longitudinally of the truck. The sub-framing or connecting means comprises the spider like part 23 connected to the sub-axle B2 similar to the connection of the previously described part to the sub-axle B1.

The other or inner end of each of the parts 23 terminates into the flanges 24 secured to the main axle A and into the ears 25 beyond the flange and the main axle. The other or inner end of the part 19 terminates into the ears 26 in respective vertical alignment with the ears 25.

The U shaped links 27 extend over each pair of vertically alined ears 25 and 26 for pivotal connection of the inner ends of the connector parts 19 and 23 of the sub-framing through the pins 28 and 29 as best seen in Figs. 2 and 3.

The main axle A has the stubs 30 on each end thereof carrying the driving wheels D which are, in this instance, driven by the motor 31 through the gears 32.

Each of the brackets C1, C2, C3, and C4 has the bosses 33 and 34 laterally adjacent to the respective downwardly extending bosses 35 on the sub-axles B1 and B2. The pivot pins 36 extend through the bosses 33, 34 and 35 transversely of the truck. The bosses 37 and 38 are on the ends of each of the two arms of the brackets for reception of the vertical pivot pins or parts 39 of the steering wheels for swivel thereof on axes vertically of the truck.

The pivot pins 36 are parts of the sub-axles and the outer ends thereof terminate substantially flush with the sides of the truck. The bosses 33 and 34 form journals for the brackets on the pivot pins 36 closely adjacent the bosses 35. This structure provides a substantial means for distributing the load on the brackets to the two bearings 33 and 34 and thereby prevents excessive wearing on either one of the bearings and consequent longer life thereof and prevents tilting of the brackets and the wheels thereon when the bearings do wear since the co-operating bearings 33 and 34 wear substantially evenly.

The brackets are formed to provide sufficient room for the steering wheels to swivel or pivot sufficiently far for steering of the truck into a path of travel of short radii.

The steering arms 40 extend from the respective or corresponding steering wheels at such angular relation with each other and with the axes of the wheels and with the steering operating mechanism that each wheel is swiveled to a proper degree so that all wheels follow one track or path as the truck is steered.

The levers 41 are pivoted on the bottom of the sub-axles and the connectors 42 on each pair of wheels E carried on each bracket establish connections between the steering arms and the levers at different distances from the axis of the pivot pin 41a of the levers 41 as shown, so that the arms 40 swivel the steering wheels so that each of them runs in one path substantially about a common pivot point.

The bars 43 and 44 operate the levers 41 and are operated by a suitable steering means not shown in the drawings since such means or devices are now well known.

The extensions 16 on the end section F2 comprises a load receiving platform which carries in this instance the electric storage battery 45 supplying electric current to the motor 31.

Another load receiving platform 46 is supported on the top of the mid section F; in this instance, the cup shaped parts 47 on the parts 10 receive the trunnion pins 48 of the tiltable platform 46, shown in dotted lines as having the load carrying surface thereof substantially parallel with the floor 50 and in dot and dash lines as tilted so that the pointed end 51 thereof contacts a floor for picking up a load. The form of the mid section permits this tilting as well as provides space below the same to clear structure there.

Fig. 5 shows clearly that the sections of the framing are vertically articulate and that the axes of the pivot pins 13 of the framing are spaced different distances from the axes of the main and sub-axles and that the axis of the trunnion of the platform is spaced from the axis of the main axle vertically and longitudinally of the truck. The object of this different spacing of axes is to provide various leverages to distribute a load on the platforms and the weight of the truck proportionately onto all of the wheels of the truck. Such proportioning may be arranged for equal distribution of the load on all wheels, or a higher proportion on the driving wheels for better traction, or a higher proportion on any or all of the steering wheels, or a lower proportion on some or all of the steering wheels for ease of steering.

Fig. 1 shows that the main framing transmits the weight of a load thereon to the sub-axles and near the wheels thereon so that it is practically impossible for the truck to capsize under ordinary working conditions including travel of the truck on short radius tracks.

The main axle can tilt transversely of the truck as well as move vertically thereof to meet uneven floor conditions. There is no definite axis about which the main axle tilts. Each end of the main axle can move vertically independently of the other end, up or down, or both ends can move conjointly. When the main axle tilts relative to the sub-axles, the pivot pins 22 rotate in their respective bearings in the end axles. The sub-axles can move vertically independently of each other to meet uneven floor conditions and the brackets can swivel in a vertical plane for the same purpose.

The structure shown and described is simple, the weight of a load thereon is transmitted proportionately to the axles and the wheels thereon, is transmitted to the four corners of the truck to prevent capsizing thereof, the wheels can move vertically to meet floor conditions, and the truck can be steered to travel in paths of short radii.

As mentioned above, I am aware that my invention is applicable to trucks other than the one type specifically shown and described herein for illustration purposes and I am also aware that changes and modifications can be made in the structures and in the arrangements of the parts shown and described within the spirit and intent and scope of the appended claims; therefore, without limiting myself to the precise application of my invention as shown and described nor to the precise structures and arrangements of the parts as shown and described.

I claim:

1. An industrial truck including driving and steering wheels, a load supporting framing having axle supporting parts extending substantially to the outer sides of said steering wheels when the same are in alinement for stabilization of the truck, and a steering means for the steering wheels.

2. An industrial truck including a framing comprising a main axle, a sub-axle at each side of said main axle longitudinally of the truck, a part secured to said main axle and having a pivot pin longitudinally of the truck and journaled in one of the sub-axles, a part hinged onto the first mentioned part and having a pivot pin longitudinally of the truck and journaled in the other one of said sub-axles, a part pivoted onto both of said sub-axles with the axes of the pivots transversely of the truck.

3. An industrial truck including a main axle and supporting wheels thereon, the axes of said wheels being eccentric with the axis of said main axle, a framing composed of a mid section and wheel supported end sections swivably jointed to the respective ends of said mid section to swivel on axes transversely of the truck to provide articulation of said framing in a plane transversely of said axle, a rigid connecting means between said main axle and one of said end sections, and a flexible connection between said one end section and the other one of said end sections, to provide for individual movement of said axle and the wheels thereon.

4. An industrial truck including a wheel carrying framing composed of a mid section, and sections swivably jointed to the respective ends of said mid section to swivel only vertically, and a connector, means between and journaled in each of said end sections means to transmit the pressure of a load carried by the truck to said mid section, and the axes of swivel of said sections spaced different distances relative to each other and to the axes of the wheels on said framing and to the point of application of the pressure of the load for substantially even distribution of a load on said mid section among all of the wheels on said framing.

5. An industrial truck including a main axle and driving wheels thereon, a steering axle forwardly and a steering axle rearwardly of said main axle, a bracket on each end of each of said steering axles, a pair of sidewise alined steering wheels on each of said brackets, a load supporting framing composed of jointed together sections having the joints thereof spaced different distances from the axis of said main axle for substantially even distrbution of a load on the truck among all of said wheels, said framing extending longitudinally of the truck, and a connector means between said main and end axles and journaled in said end axles transversely of the axis thereof.

6. An industrial truck including an axle having supporting wheels thereon and a load supporting frame comprising a mid section and two end sections, one of said end sections hinged to one end of said mid section, the other one of said end sections hinged to the other end of said mid section, a connector extending from each of said end sections and connected together and to said axle.

7. An industrial truck including an axle having supporting wheels thereon and a load supporting frame comprising a mid section and two end sections, one of said end sections hinged to one end of said mid section, the other one of said end sections hinged to the other end of said mid section, a connector extending from one of said end sections and rigidly connected to said axle, and a connector extending from the other one of said end sections and hinged onto the first mentioned connector.

8. An industrial truck including a main axle and two end axles each having supporting wheels thereon and a load supporting frame comprising a mid section and two end sections, one of said end sections hinged to one end of said mid section, the other one of said end sections hinged to the other end of said mid sections, said main axle intermediate said end axles, a connector means rigidly connecting one of said end axles to said main axle, and a connector means swivably connecting the other one of said end axles to said main axle and to the first mentioned end axle.

9. An industrial truck including a main axle, and two end axles each having supporting wheels thereon and a load supporting frame comprising a mid section and two end sections, one of said end sections hinged to one end of said mid section, the other one of said end sections hinged to the other end of said mid section, said main axle intermediate said end axles, said end sections hinged onto the corresponding one of said end axles, and a load carrying platform supported on said mid section at a point substantially vertically of said main axle.

10. An industrial truck including a main axle and supporting wheels thereon, a framing composed of a mid section and an end section on each end thereof, a steering axle pivotally mounted on the respective ends of each of said end sections, a bracket on each end of said steering axle, two steering wheels spaced longitudinally of the truck and each pivotally mounted on the corresponding one of said brackets, each of said brackets having an axle bearing on the extreme outer end of said steering axles, each of said steering wheels being mounted to swivel individually, said end sections being pivoted onto the respective ends of said mid section to provide articulation for said framing when the truck encounters an uneven floor, a connecting means between said main axle and both of said end sections a link connection means between both of said end sections near said main axle so that said main axle is free to move vertically individually with respect to said steering axles, said steering axles being free to move vertically with respect to said main axle and to each other, and means for co-operatively pivoting said steering wheels to steer the truck.

11. A truck including a framing, an axle mounted to pivot relative to said framing on an axis transversely of the truck, a bracket journaled on each end of said axle to swivel on an axis transversely of the truck, two spaced bearings on each of said brackets to effect the journals of said brackets on said axle, two arms on each of said brackets to receive wheels, and the outer ones of said bearings located on the extreme end of said axle.

12. An industrial truck including a load supporting wheel carrying framing comprising sections pivoted together on axes transversely of the truck, a platform supporting pivot element on one of said sections, the axis of said supporting pivot also transversely of the truck, a load carrying platform having a part engaging said pivot element, said part so located on said platform that the same is substantially balanced on said pivot element and can be tilted vertically, the distances between the axes of the pivots for said sections and for said platform being different to distribute a load on said platform substantially even onto all of the wheels of the truck, a steering axle carried by said framing, each end of said steering axle substantially flush with the sides of the truck, a bracket journaled on each end of said steering axle, two spaced bearings on each of said brackets to effect the journals of said brackets on said axle, two arms on each of said brackets to receive steering wheels, and the outer ones of said bearings located on the extreme end of said axle.

13. A wheeled industrial truck including a main axle and wheels thereon, end axles sidewise spaced from said main axle and the ends thereof substantially flush with the ends of said main axle, a wheel carrying bracket journaled on each end of each of said end axles, a pair of steering wheels pivotally mounted on each of said brackets, a load supporting framing of relatively movable parts having the longitudinal ends thereof engaging said end axles, and a connector means between said main and end axles and journaled in said end axles.

14. A dirigible self propelling wheeled truck including a load supporting framing, an axle on each end of said framing and extending transversely of the truck and terminating substantially flush with the sides thereof, a two-armed bracket journaled on each end of each of said axles, a steering wheel rotatably mounted on each of the arms of said bracket, the supporting parts of said brackets on said axles extending to substantially the outer ends of said axles for stabilization of the truck and mitigate wear of the journal of said bracket and wabbling of said steering wheels, a platform pivotally supported on said framing to adapt the same to tilt so that an end thereof can reach under a load on a floor for moving a load from a floor onto said platform, and means to pivot said steering wheels to steer the truck.

B. E. CLARKSON.